United States Patent
Choi (10) Patent No.: US 7,283,180 B2
(45) Date of Patent: *Oct. 16, 2007

(54) COMPUTER SYSTEM AND METHOD FOR STORING TV SIGNALS THEREIN

(75) Inventor: Seung-Beom Choi, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/327,649

(22) Filed: Jan. 9, 2006

(65) Prior Publication Data

US 2006/0174280 A1    Aug. 3, 2006

Related U.S. Application Data

(63) Continuation of application No. 09/826,010, filed on Apr. 5, 2001, now Pat. No. 6,985,191.

(30) Foreign Application Priority Data

Oct. 19, 2000    (KR) ............... 2000-61708

(51) Int. Cl.
*H04N 5/44* (2006.01)

(52) U.S. Cl. ............... 348/730; 348/552; 348/460; 725/58

(58) Field of Classification Search ............... 348/730, 348/552, 460; 386/1, 83; 725/58, 131, 133–134, 725/139, 141, 42, 151, 153; *H04N 5/44*
See application file for complete search history.

(56) References Cited

U.S. PATENT DOCUMENTS 5,410,369 A    4/1995 Nakajima (Continued)

FOREIGN PATENT DOCUMENTS

| JP | 9-128090 | 5/1997 |
|---|---|---|
| JP | 10-177777 | 6/1998 |
| JP | 11-110089 | 4/1999 |

(Continued)

OTHER PUBLICATIONS

*Personal Computers Turned into VCRs*, by Konishi, ASCII, Jul. 1, 1999, part 23, No. 7, pp. 352-355.
*Record While You Watch? Watch After You Record? Experience the New Age of AV on Your Personal Computer!*, by Nakai, ASAHI Pasokon, Asashi Newspaper Co., Feb. 1, 2000, Part 25, No. 9, pp. 26-39.

*Primary Examiner*—Trang U. Tran
(74) *Attorney, Agent, or Firm*—Robert E. Bushnell, Esq.

(57) ABSTRACT

A computer comprises: a central processing unit (CPU) driving an operating system (OS); a television (TV) receiver part for receiving external television signals; a storage unit for storing the television signals therein; a reserve-recording set-up part for setting up reserve-recording conditions for the television signals; a record-controlling part for storing the television signals in the storage unit according to the set-up reserve-recording conditions; and a power control part for controlling power supply to allow switching between a normal mode and a power saving mode, and for switching from the power saving mode to the normal mode according to the set-up reserve-recording conditions when a time set-up for reserve-recording approaches, wherein the computer system supplies power to the central processing unit in the normal mode, whereas it does not supply power to the central processing unit in the power saving mode. The computer is automatically supplied with power to initiate the reserve-recording of a television program when the computer is in the power saving mode of the central processing unit, thereby minimizing power consumption due to reserve-recording.

15 Claims, 6 Drawing Sheets

U.S. PATENT DOCUMENTS

| | | |
|---|---|---|
| 5,828,417 A | 10/1998 | Itagaki et al. |
| 5,854,618 A | 12/1998 | Kiwiet et al. |
| 6,118,926 A | 9/2000 | Kim et al. |
| 6,121,962 A | 9/2000 | Hwang |
| 6,252,630 B1 | 6/2001 | Kusumi et al. |
| 6,285,406 B1 | 9/2001 | Brusky |
| 6,323,908 B1 | 11/2001 | Kida et al. |
| 6,344,878 B1 | 2/2002 | Emura |
| 6,370,317 B2 | 4/2002 | Nagano et al. |
| 6,388,714 B1 | 5/2002 | Schein et al. |
| 6,556,771 B1 | 4/2003 | Kim |
| 6,593,975 B1 | 7/2003 | Oh |
| 6,985,191 B2 * | 1/2006 | Choi ......................... 348/730 |

FOREIGN PATENT DOCUMENTS

| | | |
|---|---|---|
| KR | 003127-1993 | 2/1993 |
| KR | 008138/1997 | 2/1997 |
| KR | 016781/1998 | 6/1998 |
| KR | 017887/1998 | 6/1998 |
| KR | 041359/1999 | 6/1999 |
| KR | 004315/2000 | 1/2000 |

* cited by examiner

COMPUTER SYSTEM AND METHOD FOR STORING TV SIGNALS THEREIN

CROSS-REFERENCE TO RELATED APPLICATIONS

This application is a continuing application of applicant's Ser. No. 09/826,010 filed in the U.S. Patent & Trademark Office on 5 Apr. 2001 now U.S. Pat. No. 6,985,191, and assigned to the assignee of the present invention.

CLAIM OF PRIORITY

This application makes reference to, incorporates the same herein, and claims all benefits accruing under 35 U.S.C. §119 from my application COMPUTER SYSTEM AND METHOD FOR STORING TV SIGNALS THEREIN filed with the Korean Industrial Property Office on 19 Oct. 2000 and there duly assigned Serial No. 61708/2000.

BACKGROUND OF THE INVENTION

1. Technical Field

The present invention relates to a computer system and a method for storing television (TV) signals therein.

2. Related Art

As computer relevant technology has rapidly progressed, a variety of applications thereof have been developed accordingly. Especially, one of the technical fields showing rapid progress is the multimedia field, employing Moving Picture Experts Group (MPEG) standards for compression of moving pictures. As such a multimedia technology has developed, the computer has been able to serve as a means for the appreciation of digital music and reception of television (TV) broadcasting based on public networks. In the case of the reception of television signals via a computer, it is advantageous that clear images be provided because the number of scanning lines of a monitor of the computer are much greater than those of the television screen.

There is a need to receive and record television signals with a computer in conjunction with power saving features, efficiency, and convenience. Efforts have been made in the area of television signals and video signals.

Exemplars of recent efforts in the art include: Korean Patent First Publication No. 003127/1993 to Sung-Won Cho, entitled METHOD OF CONTROLLING A VIDEO CASSETTE RECORDER BY USING A COMPUTER CONNECTED TO THE VIDEO CASSETTE RECORDER, published on 24 Feb. 1993; Korean Patent First Publication No. 008138/1997 to Bong-Chul OH, entitled METHOD OF PROGRAMMING FOR RECORDING A TV BROADCASTING CHANNEL BY USING A COMPUTER CONNECTED TO THE TV, published on 24 Feb. 1997; Korean Patent First Publication No. 016781/1998 to Yoon-Soo Shin, entitled METHOD OF PROGRAMMING FOR RECORDING IN A VCR BY USING A COMPUTER CONNECTED TO THE VCR, published on 5 Jun. 1998; Korean Patent First Publication No. 017887/1998 to Ki-Bok Moon, entitled METHOD OF PROGRAMMING FOR RECORDING IN A PC-VCR, published on 5 Jun. 1998; Korean Patent First Publication No. 041359/1999 to Kyu-Nam Kim, entitled METHOD OF STORING INFORMATION ABOUT INTERNET SITES, published on 15 Jun. 1999; Korean Patent First Publication No. 004315/2000 to Sham Lee, entitled METHOD OF CONTROLLING A POWER OF A DIGITAL TELEVISION HAVING A PERSONAL COMPUTER FUNCTION AND A TELEVISION FUNCTION, published on 25 Jan. 2000; Japanese Patent First Publication No. 9-128090 to Sato, entitled VTR-INCORPORATED PERSONAL COMPUTER, published on 16 May 1997; Japanese Patent First Publication No. 10-177777 to Nakajima, entitled PROGRAM RESERVATION SYSTEM AND RECORDING MEDIUM, published on 30 Jun. 1998; and Japanese Patent First Publication No. 11-110089 to Kashimoto et al., entitled COMPUTER SYSTEM AND NETWORK CONTROLLER USED BY SAME COMPUTER SYSTEM, published on 23 Apr. 1999.

While these recent efforts provide advantages, they fail to adequately provide a system and method for receiving and recording television signals with a computer, in conjunction with power saving features, efficiency, and convenience.

SUMMARY OF THE INVENTION

Therefore, the present invention has been developed in view of the above shortcomings, and it is an object of the present invention to provide a computer system which is automatically turned on when a television program reserve-recording operation starts, and which is automatically turned off when the recording operation is finished, thereby saving power consumption due to the reserve-recording, and a method for storing television signals therein.

This and other objects of the present invention may be achieved by provision of a computer comprising: a central processing unit (CPU) driving an operating system (OS); a television receiver part for receiving external television signals; a storage unit for storing the television signals therein; a reserve-recording set-up part for setting up reserve-recording conditions for the television signals; a record-controlling part for storing the television signals in the storage unit according to the set-up reserve-recording conditions; and a power control part for controlling power supply to allow switching between a normal mode and a power saving mode, and for switching the power saving mode to the normal mode according to the set-up reserve-recording conditions when the time for reserve-recording approaches, wherein power is supplied to the central processing unit under the normal mode whereas power is not supplied to the central processing unit under the power saving mode.

Preferably, the reserve-recording set-up part comprises a password skipping part for skipping a password when the power saving mode is changed to the normal mode and the password is given to the computer system.

It is also preferable that the power control part change the power mode of the central processing unit from the normal mode to the power saving mode after reserve-recording conditions are set up through the reserve-recording set-up part. The reserve-recording set-up part further comprises a mode selection window display for selecting the power mode of the central processing unit after the reserve-recording conditions are set up, and the power control part switches the power mode of the central processing unit according to selection of the power mode through the mode selection window display.

Preferably, the power control part switches the power mode of the central processing unit from the normal mode to the power saving mode after the reserve-recording of the television signals is finished, and the record-controlling part further comprises a mode selection window display for selecting the power mode of the central processing unit after the reserve-recording conditions are set up.

Preferably, the power control part switches the power mode of the central processing unit from the power saving mode to the normal mode when power is supplied to the computer system by a user when the computer system is in the power saving mode, and the reserve-recording part comprises an identification window display for identifying the reserve-recording conditions when the power saving mode of the central processing unit is changed to the normal mode, wherein the identification window display enables withdrawal, change and approval of the set-up reserve-recording conditions therethrough.

It is preferable that the storage unit comprise any one of a hard disk drive, a recordable compact disk drive, and a recordable digital versatile disk (DVD) drive.

According to another aspect of the present invention, this and other objects may also be achieved by a provision of a method for storing television signals in a computer comprising a central processing unit, an input unit, a monitor, a readable and writable storage unit and a television receiver part for receiving the television signals and for outputting the television signals to the monitor. The method comprises the steps of: setting up reserve-recording conditions to record the television signals received through the receiver part in the storage unit; switching a power mode of the central processing unit from a power saving mode to a normal mode when reserve-recording is initiated according to the set-up reserve-recording conditions, wherein power is supplied to the central processing unit under the normal mode whereas the power is not supplied to the central processing unit under the power saving mode; and storing the television signals in the storage unit according to the reserve-recording conditions.

Preferably, the switching step comprises the steps of determining whether a password is given to the computer system, and skipping the password when it is determined that the password is given to the computer system.

The method according to the present invention further comprises the steps of switching the power mode of the central processing unit from the normal mode to the power saving mode after setting up of the reserve-recording conditions is finished, and displaying a mode selection window display allowing a user to select a power mode of the central processing unit after setting up of the reserve-recording conditions is finished.

Desirably, the method further comprises the steps of switching the power mode of the central processing unit from the normal mode to the power saving mode after reserve-recording of the television signals is finished, and displaying a mode selection window display allowing a user to select the power mode of the central processing unit after reserve-recording of the television signals is finished.

The method further comprises the step of switching the power mode of the central processing unit from the power saving mode to the normal mode when the power is supplied to the computer system by a user and the computer system is in the power saving mode, and the step of displaying an identification window display for identifying the reserve-recording conditions where the power mode of the central processing unit is switched from the power saving mode to the normal mode.

According to still another aspect of the present invention, this and other objects may also be achieved by provision of a method for storing television signals in the computer system, allowing for switching between a normal mode and a power saving mode, wherein power is supplied to the central processing unit under the normal mode whereas power is not supplied to the central processing unit under the power saving mode. The method comprises the steps of: setting up reserve-recording conditions such as start time of the reserve-recording of the television signals; identifying whether the power mode of the central processing unit is in the power saving mode when a start time of the reserve-recording approaches; and storing the television signals received from the outside by converting the power saving mode to the normal mode thereof when the power mode of the central processing unit is in the power saving mode.

Preferably, the method further comprises the steps of switching the power mode of the central processing unit from the normal mode to the power saving mode after setting up of the reserve-recording conditions is finished, switching the power mode of the central processing unit from the normal mode to the power saving mode after reserve-recording of the television signals is finished, and switching the power mode of the central processing unit from the power saving mode to the normal mode when power is supplied to the computer system by a user when the computer system is in the power saving mode.

To achieve these and other objects in accordance with the principles of the present invention, as embodied and broadly described, the present invention provides a computer apparatus, comprising: a central processing unit driving an operating system; a recording set-up unit for setting recording conditions for recording television signals; a control unit for controlling the recording of the television signals in dependence upon the recording conditions; a storage unit for storing the television signals; a power control unit for controlling power supplied in a normal mode and in a power saving mode, for automatically switching the power saving mode to the normal mode in dependence upon the recording conditions, power being supplied to said central processing unit in the normal mode, and power not being supplied to said central processing unit in the power saving mode The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

A method of recording a television program on a computer system will be described with respect to FIG. 5. The recording shown in FIG. 5 comprises a "reserve-recording" operation. The phrase "reserve-recording" can refer to recording of a signal which is set to be performed automatically at a predetermined time. For example, on 25 Feb. 2001, a person can program a video cassette recorder (VCR) to record a television show which is scheduled to be broadcast on television on 27 Feb. 2001. Thus, the phrase "reserve-recording" can be used to describe a recording operation which is performed automatically, without user intervention, at a predetermined reserved time.

Figure 5:
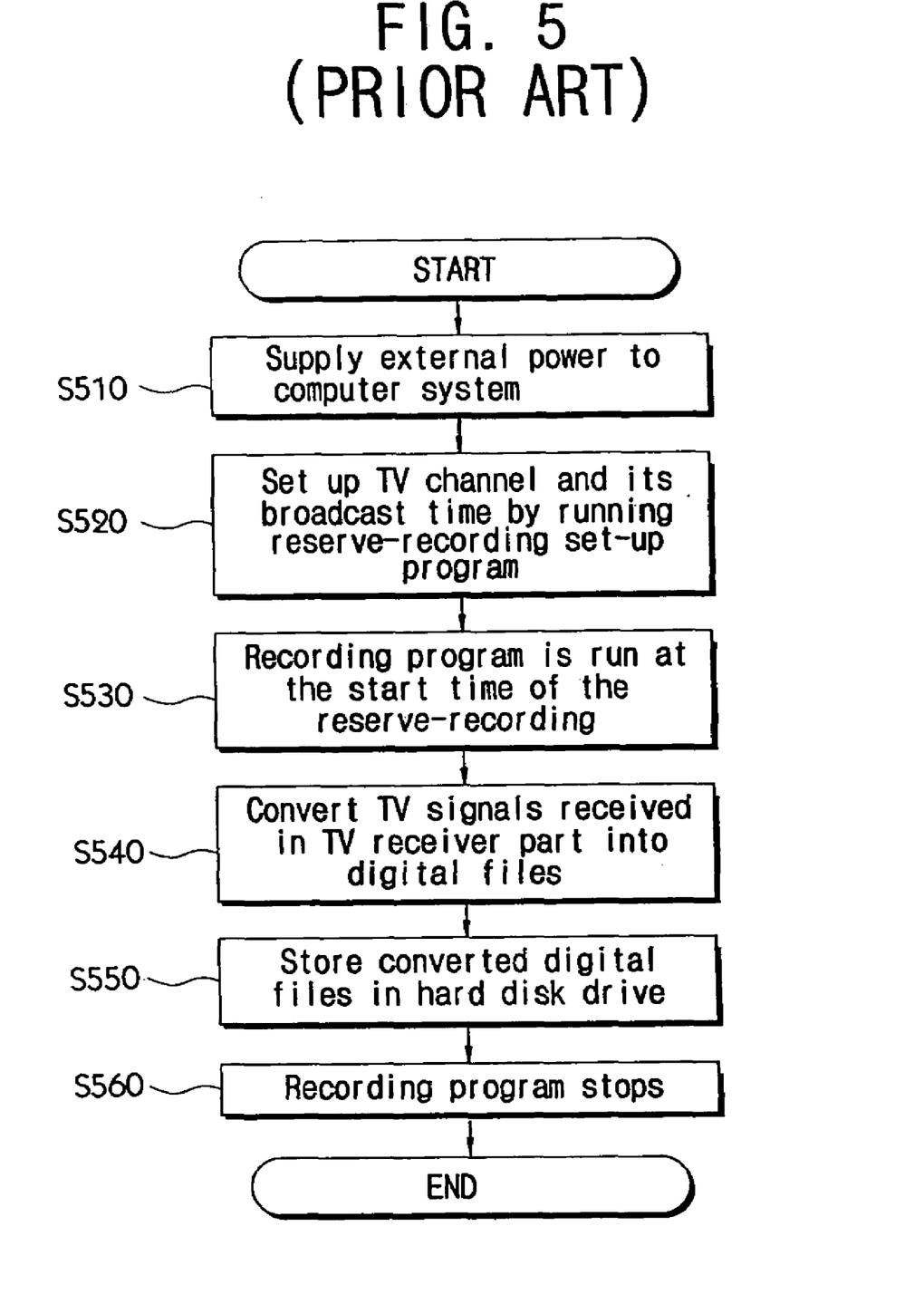
FIG. 5 is a flow chart of a method of recording a television program.

In FIG. 5, at step S510, power is supplied to a computer system. At step S520, a reserve-recording set-up program installed in the computer system is executed to allow a user to set up a broadcasting channel to be recorded and a broadcast time thereof. At step S530, when the computer system is on at the time of initiation of the reserve-recording, the reserve-recording set-up program is automatically activated. At step S540, received television signals are converted into digital files in a television receiver part. As an example, these digital files can comprise video files such as Moving Picture Experts Group (MPEG) files, audio visual interleaved (AVI) files, RealPlayer media (RM) files, or Windows Media Player media (WMV) files. At step S550, the digital files are stored in a hard disk drive which is a storage unit in the computer system. At step S560, after the recording is finished, the execution of the recording program automatically terminates.

However, in the television program reserve-recording method of FIG. 5, it is required that the computer system be powered on prior to the reserve-recording, even when the user is not using the computer system. Also, in the method of FIG. 5, the computer system does not turn off after the recording is finished, thereby causing an unnecessary consumption of power.

Figure 1:
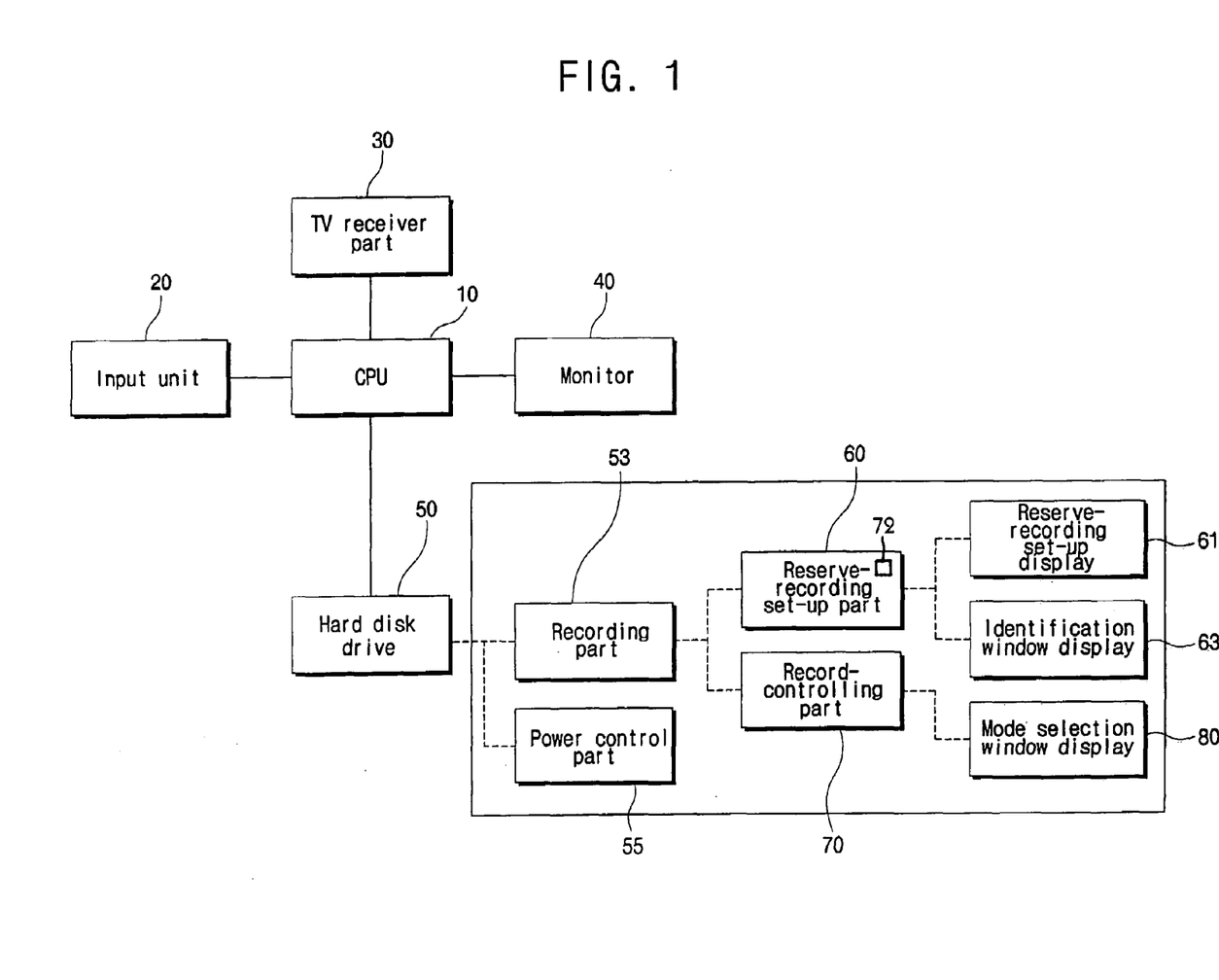
FIG. 1 is a block diagram of a computer system, in accordance with the principles of the present invention.

Referring to FIG. 1, a computer system of the present invention comprises a central processing unit (CPU) 10 driving an operating system (OS) of the computer system, an input unit 20 for inputting external commands into the CPU 10, a television receiver part 30 for receiving external television signals therein, a monitor 40 for outputting the television signals received in the television receiver part 30, and a hard disk drive 50 serving as a storage unit.

The CPU 10 is supplied with power to drive the operating system of the computer system. The CPU 10 outputs the television signals to the monitor 40 in cooperation with the television receiver part 30 and a recording part 53 to be described later, and stores the television signals in the hard disk drive 50 substantially at the same time.

The hard disk drive 50 comprises a recording part 53 which is software to receive the television signals, to convert the received television signals into digital files such as MPEG files or AVI files, for example, and to output and record the converted digital files, and a power control part 55 for controlling supply of power to the CPU 10 according to reserve-recording conditions of the recording part 53 so as to turn the computer system on or off. The television signals converted into digital files through the recording part 53 are stored in the hard disk drive 50.

The recording part 53 comprises a reserve-recording set-up part 60 which is software to receive the television signals and to set up the reserve-recording conditions, and a record-controlling part 70 for outputting and recording the received television signals. The reserve-recording set-up part 60 includes a password skipping part 72.

The reserve-recording set-up part 60 comprises a reserve-recording set-up window display 61 for setting up the reserve-recording conditions, a mode selection window display 80 for selecting a power mode (that is, power saving mode or normal mode) of the central processing unit after setting up the recording conditions, and an identification window display 63 for identifying the set-up reserve-recording conditions. When the computer system needs to have a password in order to operate, the password skipping part 72 in the reserve-recording set-up part 60 installs a password skip flag at a password designating point of the system basic input output system (BIOS). Accordingly, when the power mode is switched from the power saving mode to the normal mode, the password can be automatically skipped even though it is established in the system.

Thus, if a password is required when the computer system goes from power saving mode to normal mode, the password skipping part 72 can enable the present invention to work properly without user intervention since the password requirement will not impede the process of the present invention. The password skipping part 72 can be set to cause the computer system to go from power saving mode to normal mode without requiring a user to manually enter a password at the moment that the computer system goes from power saving mode to normal mode for the recording of television signals in accordance with the principles of the present invention. Also, the password skipping part 72 can be not set, thus causing the computer system to require that a user manually enter a password at the moment that the computer system goes from power saving mode to normal mode for the recording of television signals. The present invention can also work without the password skipping part 72 because some computer systems are configured to not require a password when changing from a power save mode to a normal mode. The password skipping part 72 is a desirable enhancement which adds convenience.

The password skipping part 72 can be configured to eliminate the need for a password to be entered only at times when a television signal will be recorded. Thus, if the mouse of the computer system is moved and the computer system is starting to change from the power save mode to a normal mode, then the password would be required to be entered by the user, since television signals are not about to be recorded.

Figure 3:
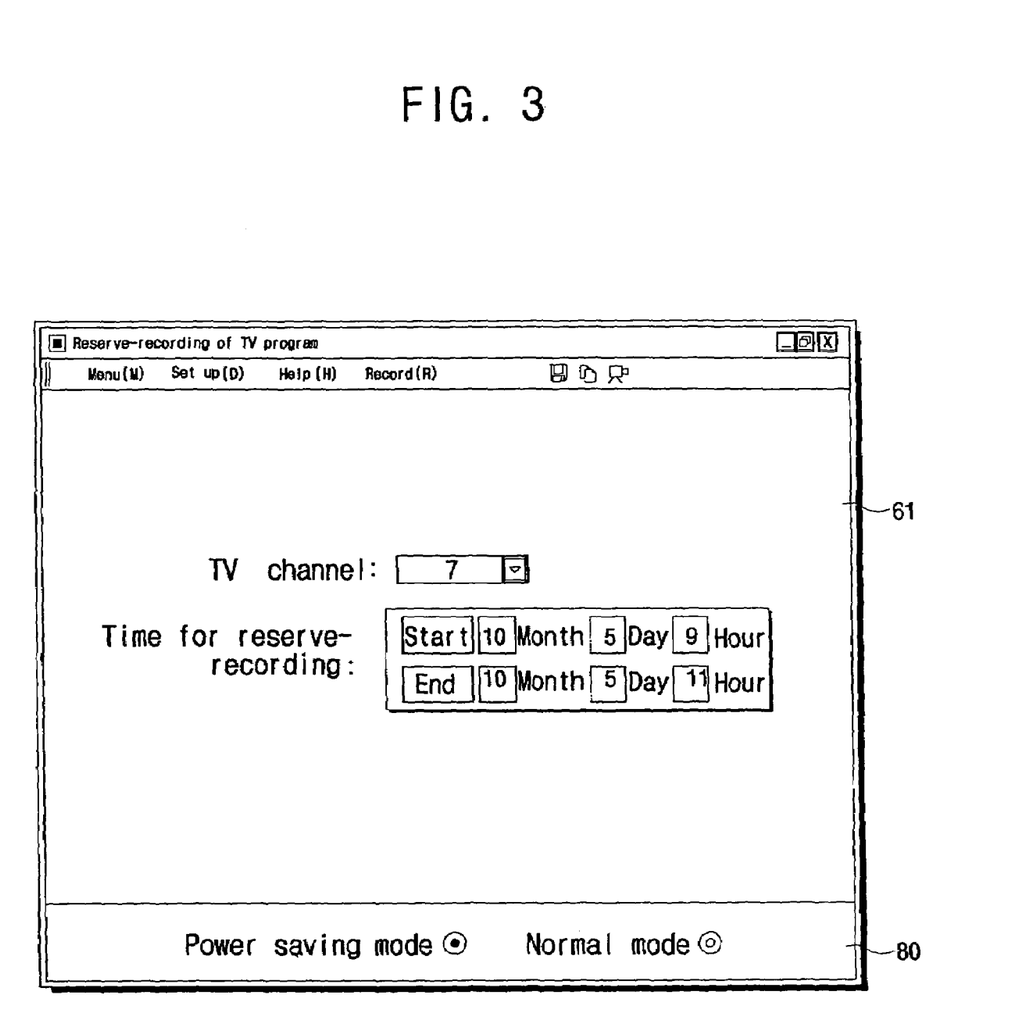
FIG. 3 is a view showing a window display for setting up reserve-recording of the television program, in accordance with the principles of the present invention.

The user can select a desired television broadcasting channel and its broadcast time as reserve-recording conditions through use of the reserve-recording set-up window display 61. The mode selection window display 80, shown along with the reserve-recording set-up window display 61, is used in selecting the power mode of the CPU 10 after the user sets up the reserve-recording conditions. The user can select the power saving mode while he or she is not using the computer after setting up the reserve-recording conditions, and he or she can select the normal mode while he or she continues to use the computer.

The identification window display 63 for identifying the reserve-recording conditions is used in changing, withdrawing or approving the set-up reserve-recording conditions displayed in the monitor 40 when the power mode of the system is changed from the power saving mode to the normal mode by the user after setting up the reserve-recording conditions.

The record-controlling part 70 receives the television signals through the television receiver part 30, converts them into digital files, such as MPEG files or AVI files, which can be used in the computer system, and outputs them to the monitor 40, and at the same time stores them in the hard disk drive 50. The record-controlling part 70 allows the user to determine whether to continue to use the computer system or whether to stop its operation, through the mode selection window display 80, after the recording is finished.

The power control part 55 is a type of application program for controlling the hardware of the computer system. The power control part 55 controls the supply of power to the CPU 10 according to the reserve-recording conditions so that the power mode is automatically changed to the normal mode in which power is supplied to the CPU 10, or to the power saving mode in which power is not supplied to the CPU 10.

In the normal mode, all of the hardware of the computer system, including the CPU 10, is operated in a normal manner. For example, the process of receiving television signals in the television receiver part 30 and storing them in the hard disk drive 50 is performed in the normal mode. However, if the power mode is converted to the power saving mode by the power control part 55, all of the jobs done up to that time are saved in the hard disk drive 50, and then the monitor 40, the hard disk drive 50, and the CPU 10 are turned off, and thus the computer system is finally turned off.

Figure 2:
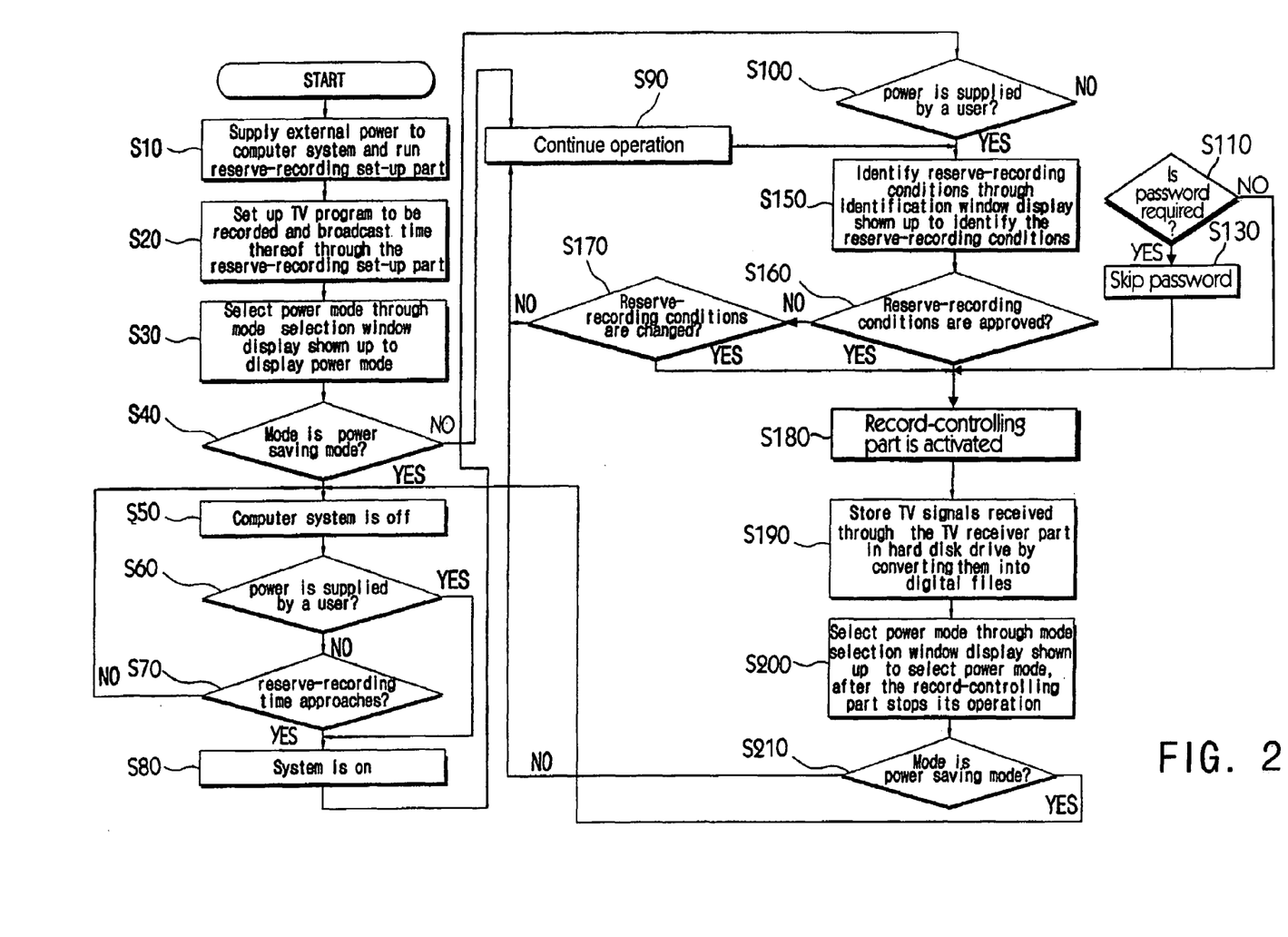
FIGS. 2 and 6 are flowcharts illustrating a method of reserve-recording a television program on the computer system, in accordance with the principles of the present invention.
Figure 6:
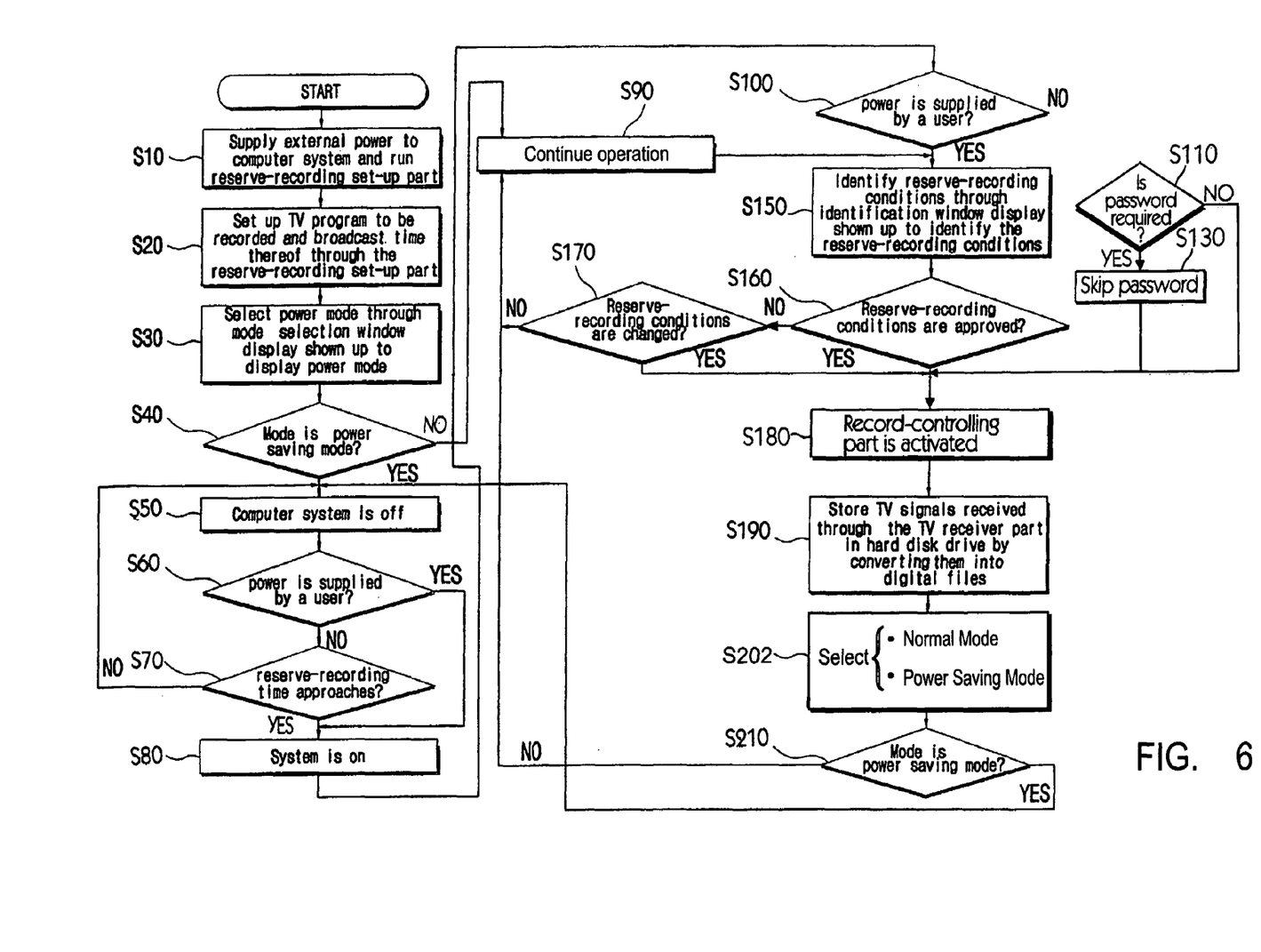

Referring collectively to FIGS. 2 and 6, the process of receiving television signals and storing them in the hard disk drive 50 according to the reserve-recording conditions will be described. A user connects power to the computer system so as to activate the reserve-recording set-up part 60, for receiving television signals and storing them in the hard disk drive 50 in the form of a digital file (S 10). Subsequently, the reserve-recording set-up window display 61 appears as seen in FIG. 3, allowing the user to set up the reserve-recording conditions, and accordingly, the user sets up a television broadcasting program desired for reserve-recording and a broadcast time (S20).

Once the reserve-recording conditions are set up, the window display shows the mode selection window display 80 through which the user is allowed to determine whether to stop using the computer system after setting up the reserve-recording conditions or whether to continue using the computer system (S30). It is then determined whether the power saving mode is selected (S40). If the normal mode is selected, the computer system continues to operate (S90), and then the power control part 55 supplies power to the CPU 10 so as to allow the user to use the computer system.

If the power saving mode is selected, the process of terminating the computer system is conducted (S50). The power control part 55 stores all of the jobs within a memory of the computer system in the hard disk drive 50, and then turns off the hard disk drive 50 and the CPU 10.

In the off state of the computer system, if the user connects the power to resume use of the computer system (S60) or if the reserved broadcast time approaches (S70), the computer system is automatically turned on (S80).

In step S70, the power control part 55 checks the reserve time using a timer (not shown) installed in the computer system, and supplies power to the CPU 10 a few minutes before the reserve-recording time starts so as to allow the computer system to be turned on for reserve-recording. The power control part 55 determines whether the computer system is turned on by the user at the same time as the system is turned on (S100).

Where the computer system is not turned on by the user, a determination is made as to whether a password is required (S110). If no password is required, step S180 is performed after step S110. If a password is required, then step S130 is performed after step S110. If a password is required and was previously given to the system, the reserve-recording set-up part 60 provides a password skip flag to the system basic input output system (BIOS) so as to skip the password (S130).

After the record-controlling part 70 in the recorder part 53 is activated in dependence upon the reserve-recording conditions set up through the reserve-recording set-up part 60 (S180), it receives the television signals through the television recorder part 30, converts them into digital files employable in the computer system, and outputs them to the monitor 40, while at the same time storing them in the hard disk drive 50 (S190).

Figure 4:
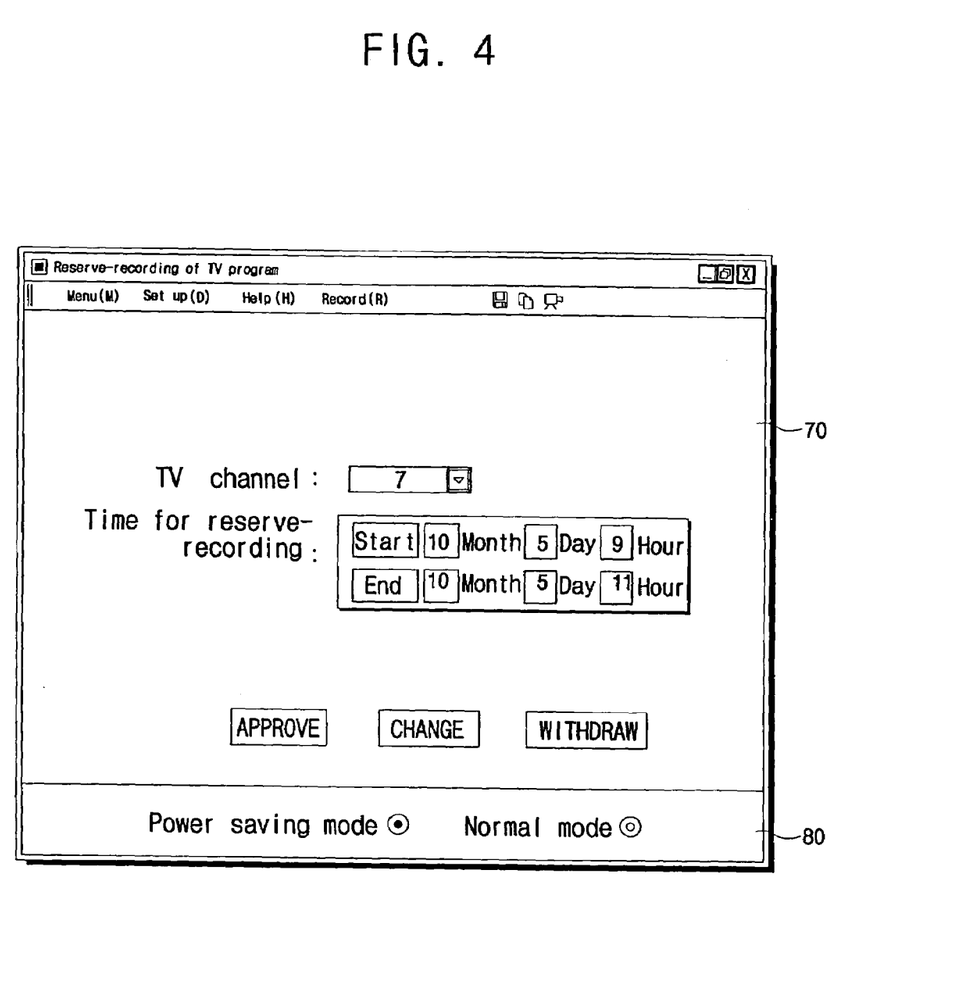
FIG. 4 is a view showing an identification window display for identifying the reserve-recording conditions in the computer system, in accordance with the principles of the present invention.

The recording is finished by the record-controlling part 70 according to the reserve-recording conditions set up through the reserve-recording set-up part 60, and the mode selection window display 80 is shown in the monitor 40, allowing the user to determine whether to continuously use the computer or to maintain the computer in suspension (S200); in other words, at step S202, a user is presented with choices of making a selection of a normal mode or a power saving mode after completion of the recording. Step S210 is performed after step S200 in order to determine whether the mode is the power saving mode. Where the mode selection window display 80 is not used because of the user's need for sleep or rest, etc., the power saving mode is automatically selected, and step S50 is accordingly conducted. Conversely, where the power mode can be selected through the mode selection window display 80, a determination as to whether or not the power saving mode is selected is made, and step S90 or step S50 is conducted depending upon the determination (S210).

Where it is determined through step Si 00 that the system is turned on by the user, step S150 is executed. In step S150, the identification window display 63 for identifying the reserve-recording conditions within the reserve-recording set-up part 60 is displayed as seen in FIG. 4, allowing the user to change, withdraw or approve the reserve-recording conditions. Where the reserve-recording conditions are approved in step S160 or are changed in step S170, step S180 is then executed. Where the reserve-recording conditions are withdrawn, step S90 is carried out. Where the reserve-recording conditions are not identified for a predetermined period of time after the identification window display 63 is shown, although this situation is not shown in the figures, the reserve-recording conditions are automatically approved and subsequently step S180 is carried out, to activate the record-controlling part 50.

In the preferred embodiments described above, the television signals received through the television receiver part 30 are converted into digital files, such as MPEG files or AVI files, for example, and they are saved in the hard disk drive 50. However, the objects of the present invention may be achieved even if they are saved in a compact disk drive (not shown), or a recordable digital versatile disk (DVD) drive (not shown), or other form of storage device.

As described above, the computer system and the method for storing television signals therein, according to the present invention, allow the computer system to be automatically turned on for reserve-recording of a television program and to be automatically turned off after the reserve-recording is finished, thereby minimizing power consumption due to the reserve-recording.

While the present invention has been illustrated by the description of embodiments thereof, and while the embodiments have been described in considerable detail, it is not the intention of the inventor to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the general inventive concept.

What is claimed is:

1. A computer system, comprising:
a central processing unit for driving an operating system;
a television receiver disposed to receive television program signals from external sources;
a storage unit for storing the television program signals in digital form; a reserve-recording set-up part for setting up conditions for reserve-recording of the television program signals, said conditions including a time to start the reserve-recording;
a record-controlling stage for storing the television program signals in said storage unit in accordance with said reserve-recording conditions; and
a power control stage for receiving user instructions and for controlling power supplied in a normal mode and in a power saving mode, and for automatically switching from the power saving mode to the normal mode according to the set-up reserve-recording conditions when the time to start the reserve-recording approaches, power being automatically supplied to said central processing unit when switched to the normal mode, power not being supplied to said central processing unit when switched to the power saving mode, and upon completion of said storing of said television program signals in accordance with said user instructions said power control stage automatically switching from said normal mode to said power saving mode.

2. The system of claim 1, said reserve-recording set-up part skipping a requirement for a user to enter a password when the power saving mode is switched to the normal mode and the password has previously been supplied to the computer system.

3. The system of claim 1, said power control stage switching said central processing unit from the normal mode to the power saving mode after the reserve-recording conditions are set up through said reserve-recording set-up part.

4. The system of claim 1, said reserve-recording set-up part providing a mode selection window display operable by a user to select a power mode of said central processing unit after the reserve-recording conditions are set up, said power control part automatically switching the power mode of said central processing unit in conformance with user selection of the power mode via said mode selection window display.

5. The system of claim 1, said reserve-recording part providing an identification window display identifying the reserve-recording conditions when said central processing unit is switched into the normal mode.

6. The system of claim 5, said identification window display enabling user selection of at least one of cancellation, modification, and approval of the set-up reserve-recording conditions.

7. The system of claim 1, said storage unit comprising one of a hard disk drive, a recordable compact disk drive, and a recordable digital versatile disk drive.

8. A method for storing television program signals in a computer system, said method comprising the steps of:
providing a television receiver for receiving the television program signals which are then provided to the computer system for recording;
receiving user instructions in the computer system, the computer system having a central processing unit;
setting up recording conditions to record the television program signals in a storage unit of the computer system;
automatically switching a power mode of the central processing unit from a power saving mode to a normal mode in dependence upon the recording conditions, power being automatically supplied to the central processing unit during the normal mode, and power not being supplied to the central processing unit during the power saving mode;
storing the television program signals in the storage unit according to the recording conditions; and
upon completion of said storing of the television programs signals in accordance with said user instructions, automatically switching from said normal mode to said power saving mode.

9. The method of claim 8, said switching step further comprising:
determining whether a password has been previously provided to the computer system; and
when the password has been previously provided to the computer system, skipping a requirement for subsequent enter of the password.

10. The method of claim 8, said setting up step comprising automatically switching the central processing unit from the normal mode to the power saving mode after completion of said setting up of the recording conditions.

11. The method of claim 8, further comprising displaying a mode selection window display operable by a user to select the power mode of the central processing unit after said setting up of the recording conditions.

12. A method for storing television program signals in a computer system, said method comprising the steps of:
providing a television receiver for receiving the television program signals which are then provided to the computer system for recording;
receiving user instructions in the computer system, the computer system having a central processing unit;
setting up recording conditions to record the television program signals in the computer system, the recording conditions including a time to start recording, power being supplied to the central processing unit during a normal mode, and power not being supplied to the central processing unit during a power saving mode;
determining whether a power mode of the central processing unit comprises the power saving mode and identifying when said time to start recording approaches;
automatically switching from the power saving mode to the normal mode when the power mode of the central processing unit is the power saving mode when the time to start recording arrives;

recording the television program signals in a storage unit of the computer system; and upon completion of said recording of said television program signals in accordance with said user instructions, automatically switching said computer system from said normal mode to said power saving mode.

13. The method of claim 11, further comprising automatically switching the power mode of the central processing unit from the normal mode to the power saving mode after completion of said setting up of the recording conditions.

14. The method of claim 11, further comprising not requiring a user to enter a password when the power saving mode is switched to the normal mode and the password has previously been supplied to the computer system.

15. The method of claim 11, further comprising the steps of:

providing a mode selection window display operable by a user to select the power mode of said central processing unit after the reserve-recording conditions have been set up, and automatically switching the power mode of said central processing unit according to user selection of the power mode.

* * * * *